Sept. 10, 1929.  T. MIDGLEY  1,727,405
TIRE BUILDING MACHINE
Filed Jan. 23, 1926   6 Sheets-Sheet 1

Sept. 10, 1929.    T. MIDGLEY    1,727,405
TIRE BUILDING MACHINE
Filed Jan. 23, 1926    6 Sheets-Sheet 3

INVENTOR.
Thomas Midgley
BY
Edward C. Taylor
ATTORNEY.

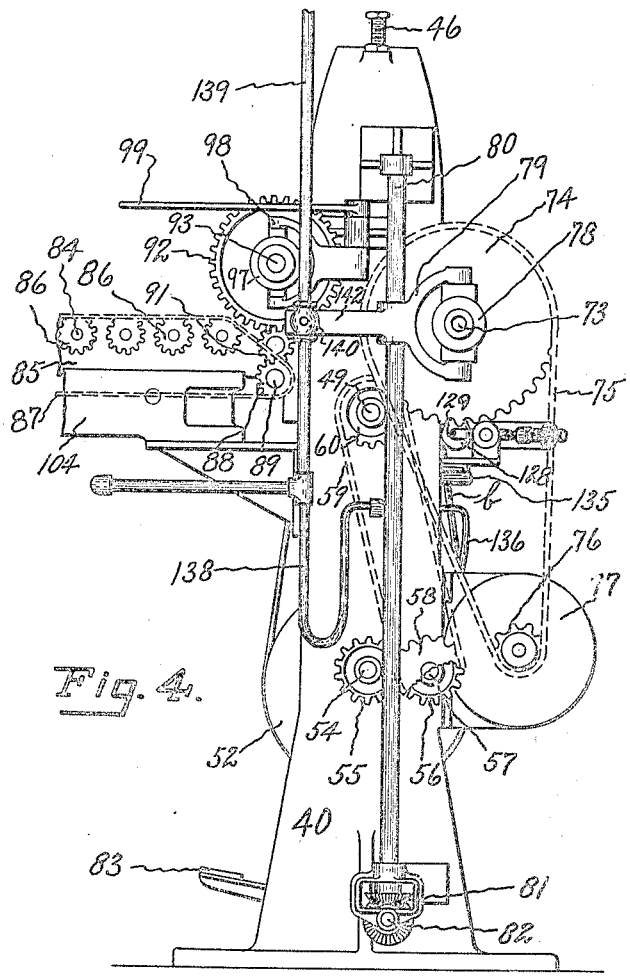

Sept. 10, 1929.  T. MIDGLEY  1,727,405
TIRE BUILDING MACHINE
Filed Jan. 23, 1926   6 Sheets-Sheet 5
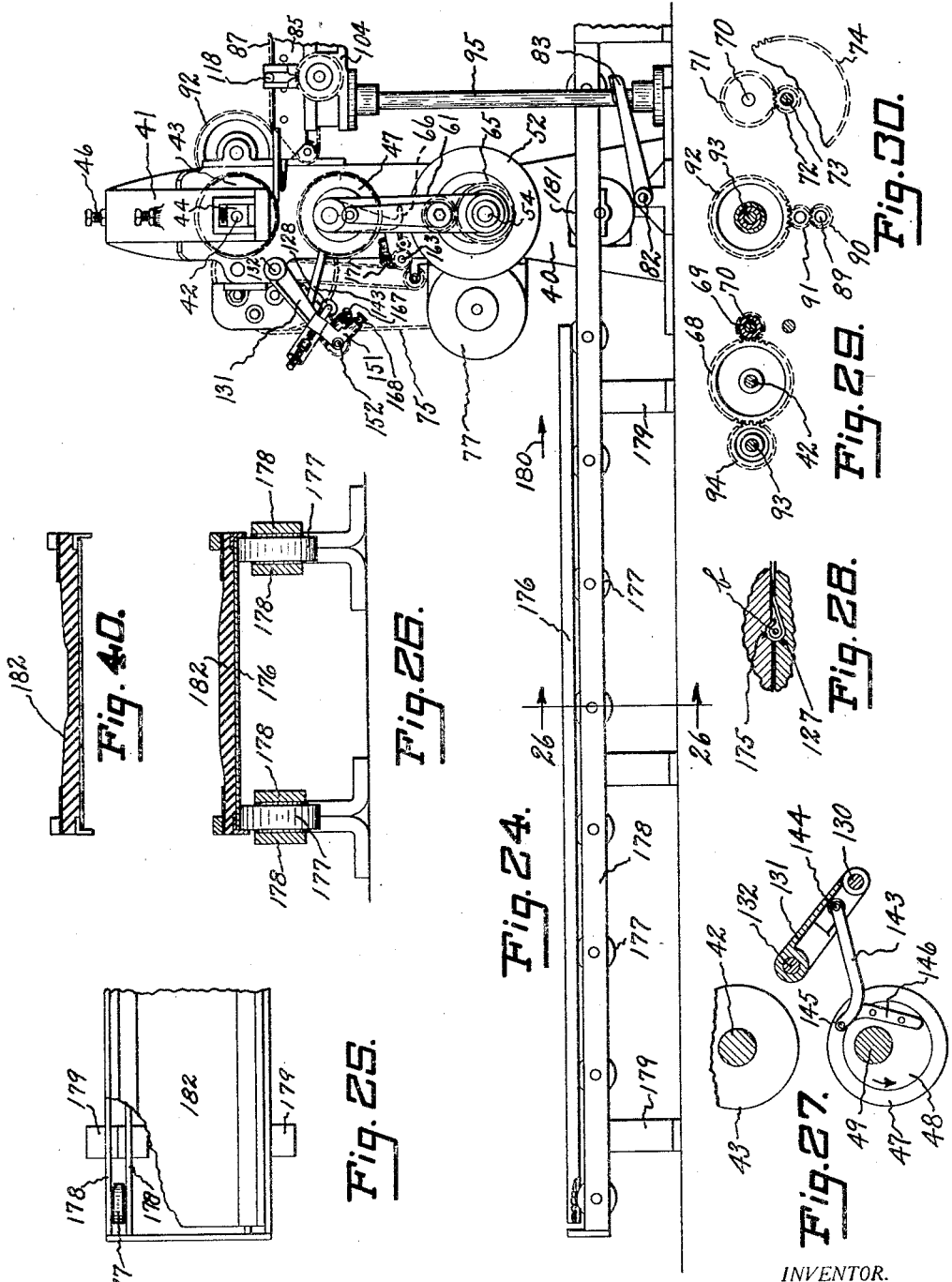
INVENTOR.
Thomas Midgley
BY
Edward Taylor
ATTORNEY.

Sept. 10, 1929.  T. MIDGLEY  1,727,405
TIRE BUILDING MACHINE
Filed Jan. 23, 1926  6 Sheets-Sheet 6

INVENTOR.
Thomas Midgley
BY
Edward C. Taylor
ATTORNEY.

Patented Sept. 10, 1929.

1,727,405

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

TIRE-BUILDING MACHINE.

Application filed January 23, 1926. Serial No. 83,209.

This invention relates to machines for building pneumatic tires, and is particularly designed for the performance of the method set forth and claimed in my prior application Serial No. 49,696, filed August 12, 1925. In accordance with that method a pair of bead anchorages are held spaced apart but unconnected, and a layer of tire building material applied to them, its margins being preferably folded around the bead anchorages to secure it firmly in place. The composite band thus formed is then turned inside out and another layer of material applied.

It is one object of the present invention to supply a machine which will hold the bead anchorages in place, apply to them a layer of material, and turn the edges of the material around the beads, all as a continuous operation. It is another object of the invention to supply a machine which will very accurately regulate the bead-to-bead distances in the tire. It is another object of the invention to supply a machine which, with only slight alterations, is capable of applying either the first or second layer of material to the beads. It is another object of the invention to supply a dual mechanism in which both the first and the second layers of material can be applied to the beads with the band reversed between operations. It is another object of the invention to supply an efficient mechanism for applying covering material to the carcass while still in flat band form.

In furtherance of these and other objects the invention has been embodied in the preferred form shown in the accompanying drawings, in which Fig. 1 is a side elevation of a machine especially adapted for placing and folding the first layer of material;

Fig. 4 is an elevation thereof looking from the opposite side than in Fig. 1;

Fig. 5 (Sheet 1) is an enlarged detail, partly in section, of a portion of the mechanism shown in Fig. 1;

Fig. 6 is a similar view illustrating the action of certain of the parts in use;

Fig. 7 is a section on line 7—7 of Fig. 5;

Fig. 8 is a section on line 8—8 of Fig. 2;

Fig. 9 is an enlarged detail of the feeding table as shown in Fig. 1, partly broken away;

Figure 1:
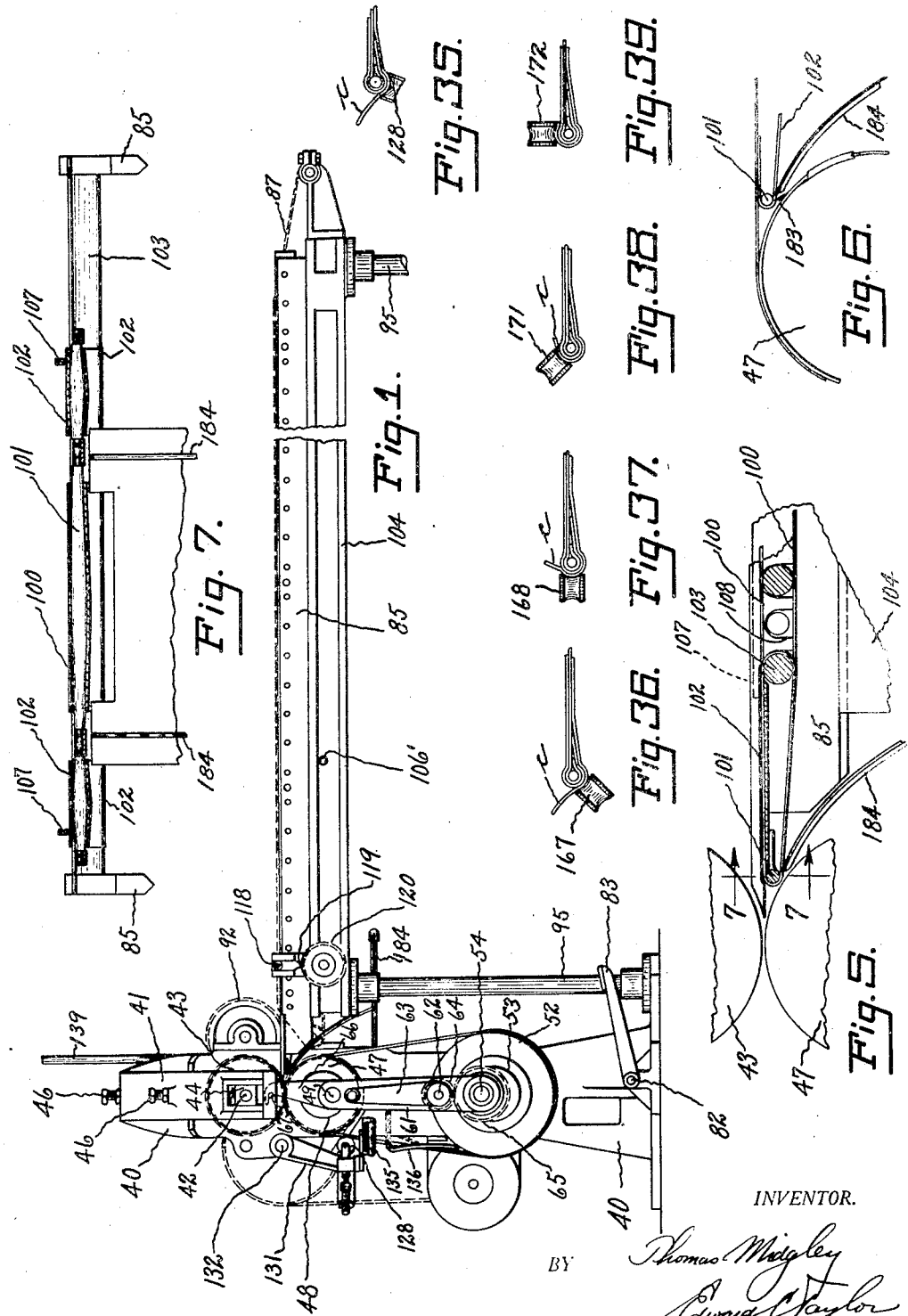

Figs. 12 to 19 inclusive are diagrammatic views showing successive steps in assembling a tire carcass;

Figs. 20 to 23 inclusive are details showing the action of the devices for folding the material around the bead anchorages;

Fig. 24 is a side elevation similar to Fig. 1 but illustrating the machine as fitted for the application of the second layer of material;

Fig. 25 is a fragmentary plan, partly broken away, of the feed table for the covering material as shown in Fig. 24;

Fig. 26 is a section on line 26—26 of Fig. 24.

Figure 3:
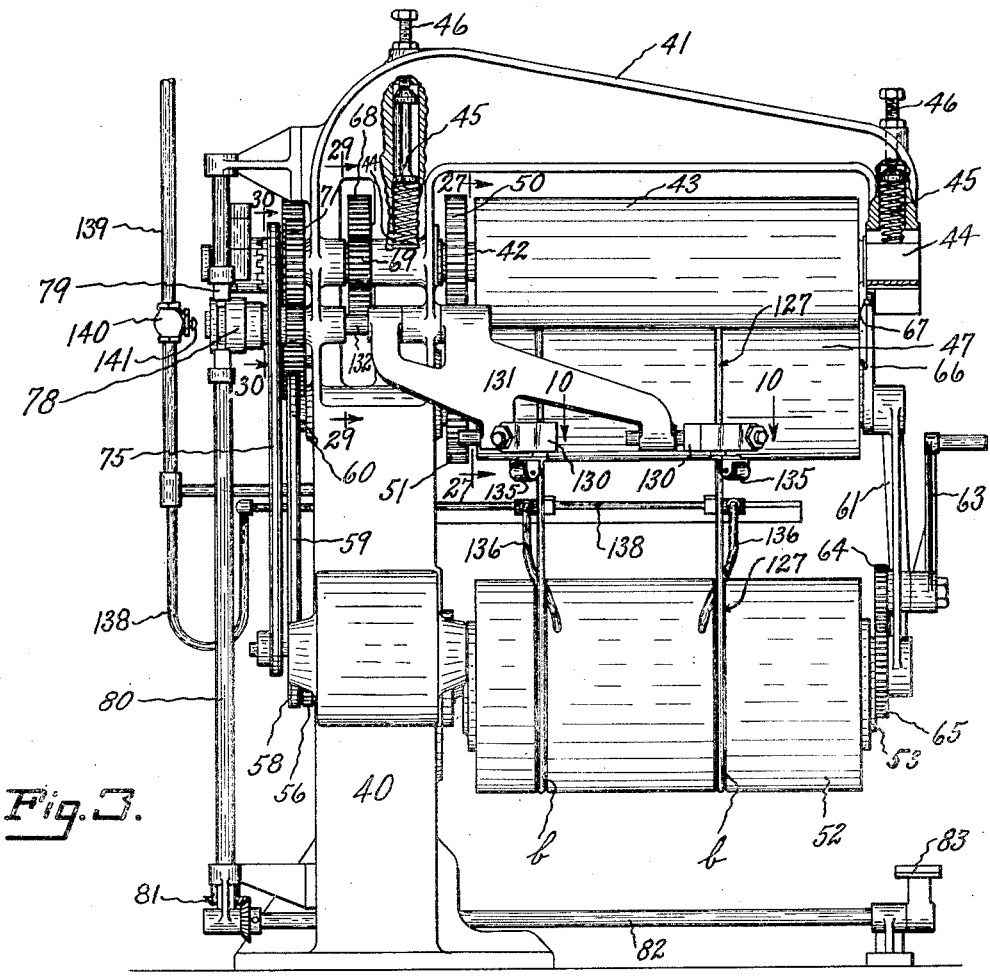
Fig. 3 is a front elevation thereof.
Figure 31:
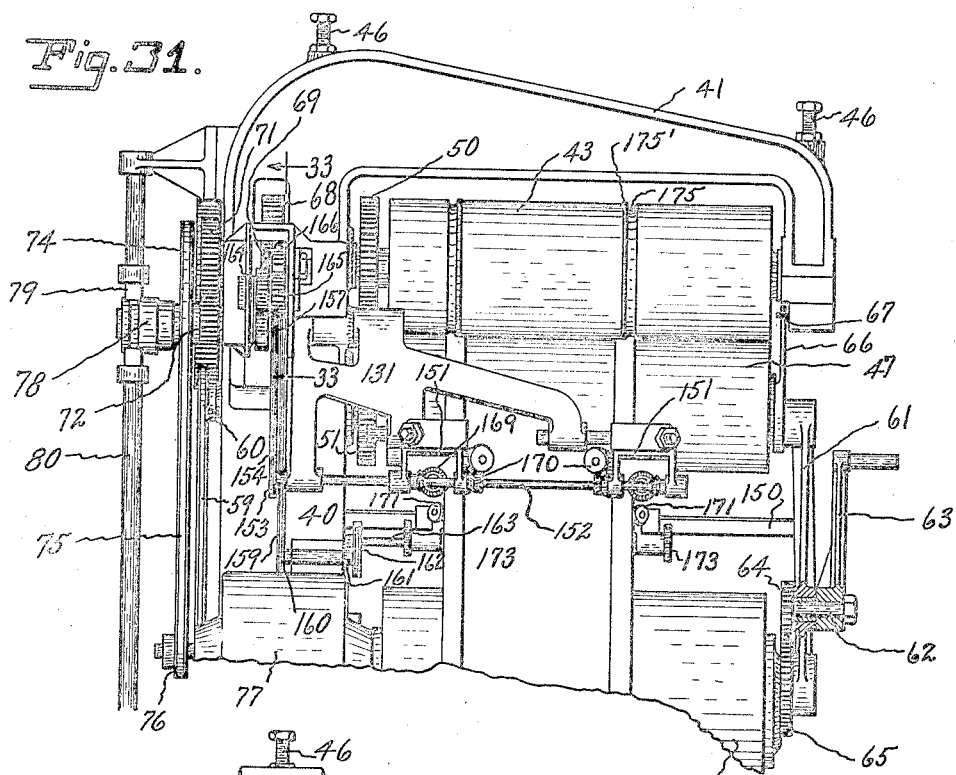
Figures 32, 33:
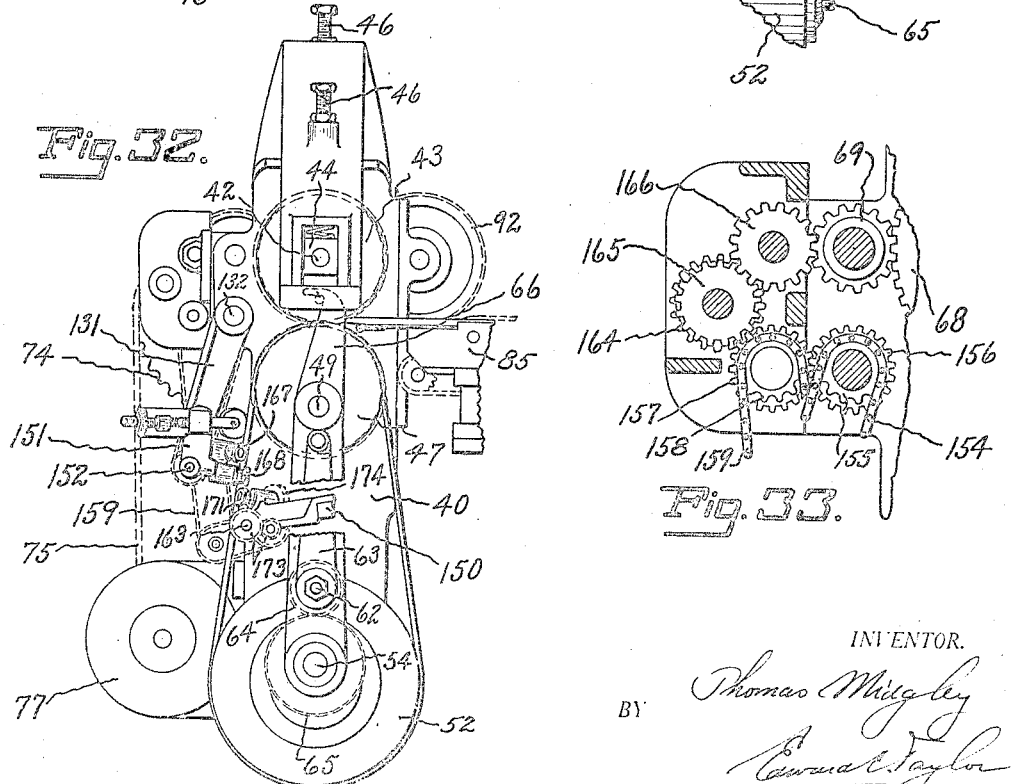

Fig. 27 is a section on line 27—27 of Fig. 3;

Fig. 28 is a detail illustrating the manner in which certain of the rolls are constructed;

Fig. 29 is a section on line 29—29 of Fig. 3;

Fig. 30 is a section on line 30—30 of Fig. 3;

Fig. 31 is a view corresponding to a portion of Fig. 3 but showing the machine arranged for the application of the second layer of material;

Fig. 32 is a side elevation, corresponding to a part of Fig. 1 but on a larger scale, showing the arrangement of folding devices used in the application of the second layer of material;

Fig. 33 is a section on line 33—33 of Fig. 31;

Fig. 34 (Sheet 2) is an enlarged detailed section of the table shown in Fig. 26, showing the covering material in place ready to be transferred to the tire carcass;

Figs. 35 to 39 (Sheet 1) are details illustrating the action of the devices for folding the margins of the third and fourth plies; and Fig. 40 (Sheet 5) shows a modification of Fig. 26.

The machine consists essentially of supporting means for holding and rotating the bead wires, a guide for supplying material to the wires, and means for folding the edges of the material around the beads. The bead holding and rotating means and the guide are substantially the same in both the first and second laying operations, but the folding devices have been shown as of a rather different type. This is preferable as in the usual case it is desirable to use a somewhat less turn-up around the beads in the second layer than in the first, and the increased difficulty of handling the narrower marginal portions of the material necessitates somewhat more exact handling than with the wider margins of the first ply. If the margins are to be the same, or if the added complexity of the folding devices used for the second layer is not objectionable, the same folding devices may be used. It is preferable, however, to use separate machines for the first and second layers since the partially completed carcass should be removed from the machine for inversion, and since this makes it practical to use two machines so that the folding and other devices can be closely adapted to the work they must perform. The machine will first be described as fitted for the application of the first layer, many of the parts which will thus be described being retained on the machine when used for the second operation.

The machine proper is supported on a base 40. Mounted at one end in this base, and at the other in an overhanging arm 41, is the shaft 42 (Figs. 3 and 29) of a roll 43. The shaft is received at each end in vertically slidable journals 44, normally held down by springs 45 kept under compression by adjusting screws 46. Directly under the roll 43 and in compressive relation with it is a roll 47, freely rotatable upon an eccentric bearing 48 (Fig. 27) formed on a shaft 49 which is journaled for rotation in the base 40. The rolls 43 and 47 carry gears 50 and 51 respectively (Fig. 3), whereby they are constrained for simultaneous rotation in opposite directions. Below the roll 47 is a third roll 52, similarly mounted on an eccentric 53 formed on a shaft 54. The last-named roll is not provided with driving connections, it being rotated by the bead wires during the operation of the machine.

The eccentric mountings of rolls 47 and 52 are provided to permit the rolls being brought closer to each other when the machine is inactive to permit the insertion and removal of the bead wires. In order to facilitate this operation the two shafts 49 and 54 are coupled together so that they may be rotated by a single operating means. Shaft 54 is provided at its end (Fig. 4) with a gear 55 meshing with a gear 56 fast on a shaft 57 which is freely rotatable in the base 40. Also fast on this latter shaft is a sprocket 58 joined by a chain connection 59 with a sprocket 60 on the end of shaft 49. The ends of shafts 49 and 54 remote from the base 40 are journaled in a spacing member 61 (Figs. 1, 3, 24 and 31). The shaft 62 (Fig. 31) of a crank 63 is also journaled in this spacing member and carries a pinion 64 meshing with a gear 65 fixed on shaft 54. By turning the crank the two shafts 49 and 54 will be rotated, together with their eccentrics, and will cause the rolls 47 and 52 to approach each other or to separate depending upon the direction of rotation given to the crank. Shaft 49 carries an arm 66 having its end formed as a hook which grasps a pin 67 fixed upon the overhanging arm 41 to hold the otherwise free ends of rolls 47 and 52 in accurate position during the operation of the machine.

The driving mechanism for rolls 43 and 47 is shown particularly in Figs. 2, 3, 4, 29 and 30. It has been mentioned before that these two rolls are provided with intermeshing gears 50 and 51. The former of these is attached to the roll shaft 42 which also carries a gear 68. This gear meshes with a pinion 69 (Fig. 29) on the idle shaft 70 suitably journaled in the base 40. Shaft 70 (Fig. 30) also carries a gear 71 meshing with a pinion 72 on a second idle shaft 73 which carries a sprocket 74. A chain 75 connects this sprocket with the sprocket 76 of a motor 77, the gear train described serving to reduce the speed of the rolls relative to the motor. The sprocket 74 has been shown as connected to shaft 73 through a clutch 78, conveniently of the cone type, operated by a shipper arm 79 carried by a vertical shaft 80. This shaft is connected by gearing 81 to a horizontal shaft 82 bearing a treadle arm 83, the arrangement being such that, with the motor running constantly, the rolls can be caused to rotate by depressing treadle 83. Other means such, for example, as the usual push button motor control may be substituted if desired for the clutch mechanism shown.

Figure 2:
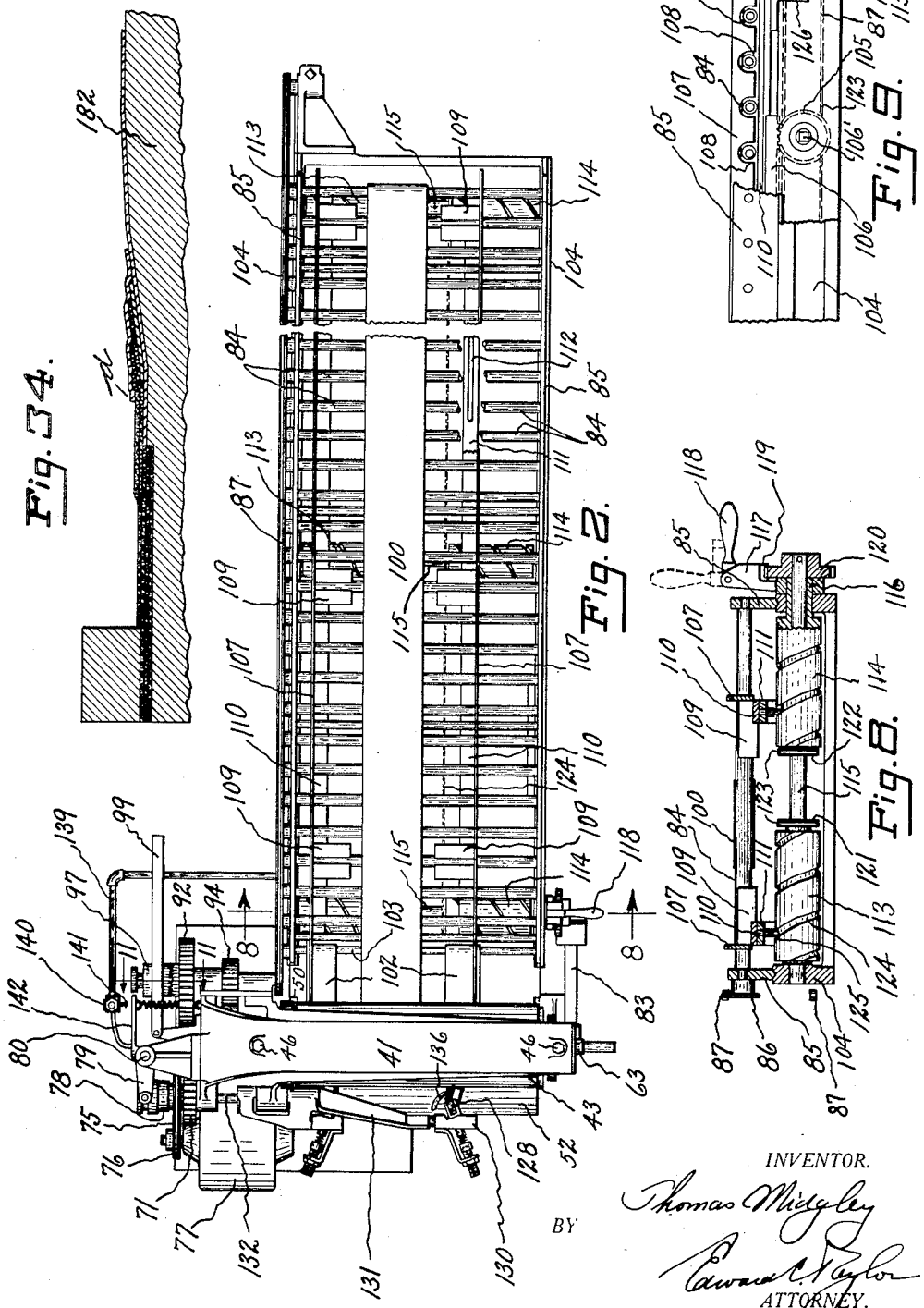
Fig. 2 is a top plan thereof.
Figures 10, 11:
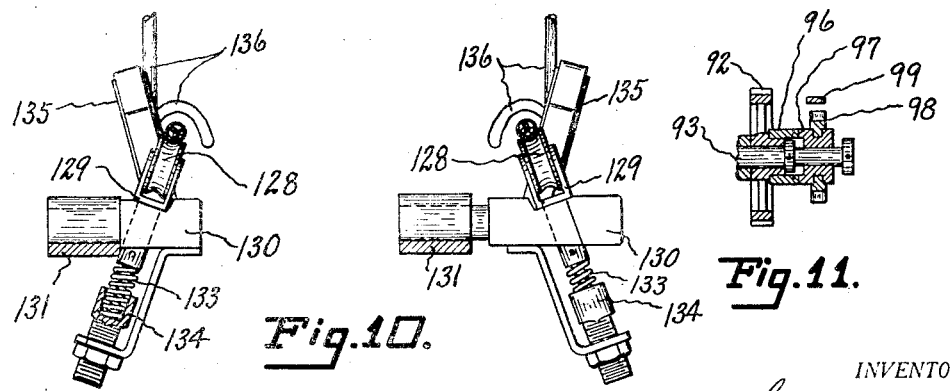
Fig. 10 is a section on line 10—10 of Fig. 3.
Fig. 11 is a section on line 11—11 of Fig. 2.

It is desirable in the practice of the method for which this machine is designed to supply the fabric of a length just sufficient to pass around the circumference of the bead wires. The material used is preferably weftless rubberized cord fabric cut on the bias, which in single ply form is very easily stretched, and it is therefore desirable to prevent any drag or tension being applied to the material as it is being led to the beads. In the present embodiment of the invention that result is accomplished by laying the fabric upon a feed table composed of a series of power driven rolls 84 journaled in side members 85 (Figs. 2, 8 and 9). At one end these rolls carry sprockets 86 (Figs. 4 and 8) over which runs a chain 87 passing around a drive sprocket 88 (Fig. 4). The shaft 89 of this latter sprocket carries a gear 90 (Fig. 30) meshing with an idle gear 91 which in turn meshes with a gear 92. Upon the shaft 93 of this gear is a pinion 94 (Figs. 2 and 29) which meshes with the gear 68 previously referred to. The proportions of the gears and the diameter of the rollers is so chosen that the speed with which the fabric advances is the same as the surface speed of rolls 43 and 47. The rolls are held by the side members 85 at an elevation such that the fabric enters directly into the bight of the rolls 43 and 47, the members being supported on posts 95 for this purpose. Preferably, in order to permit the operator who is placing fabric on the feed table to exercise control over the feeding of it, a clutch shown as composed of crown-toothed members 96 and 97 (Figs. 2, 4 and 11) is inserted between the shaft 93 and gear 92. This clutch is actuated by a shipper 98 having a handle 99. If there is any reason why the worker who is supplying fabric to the machine wishes to delay the feeding of fabric she can disengage the clutch 96—97. With that clutch disengaged, depression of treadle 83 will cause the rolls 43, 47 to be rotated, but no feeding of fabric will take place.

As a desirable refinement in the feeding of the fabric to the rolls, and as a means of increasing the accuracy of feed and of decreasing the liability of stretching the material, a belt 100 has been shown as encircling the central portion of the rolls 84. This belt shows best in Figs. 2, 5 and 7. At its end nearest the rolls 43 and 47 this belt passes around a roll 101 which is placed as near as possible to the bight of the rolls. Smaller belts 102 also pass around roll 101 and around a roll 103, as shown in Figs. 2 and 5. Preferably, as shown in Fig. 7, the roll 101 is crowned to keep the belts in proper central position. In order to facilitate access to the rolls 43 and 47 the whole feed table is conveniently made movable. One simple way is to form the side members 85 with V-shaped bottoms (Fig. 7) sliding in supports 104 carried by the posts 95 and being held in position by gravity. A gear 105 (Fig. 9) mounted in the supports 104 and meshing with a rack 106 on the side members 85 provides means, through a projecting stud 106' (Fig. 1) for making this adjustment.

By the combination of rolls and a relatively narrow belt it is possible to employ side guides 107 formed as long plates cut away at 108 (Figs. 5 and 9) to embrace the rolls and thus extend below the line of the fabric. This construction avoids any danger of the edge of the fabric slipping or jamming under the edge of the guide and is preferred for that reason. If desired, however, a wide belt can be used with the side guides resting on its top, or the belt may be chosen of a width just equal to the space between the guides. Each guide 107, in the form of construction illustrated, is supported by a series of blocks 109 sliding on one of the rolls 84 or a similar crosspiece, each series of blocks being connected by a bar 110. Underlying the bars 110 are bars 111 having slots 112 into which fit pins (not shown) on the upper bars. This permits the upper bars to move longitudinally when the feed table is moved back on the supports 104 as above described, while the two bars of each set are attached so that they must move sideways together.

Extending transversely of the feed table are axially aligned pairs of cam cylinders 113 and 114 (Figs. 2, 8 and 9). Cylinders 113 are fixed on shafts 115 which are journaled in the supports 104, while cylinders 114 are free to turn upon the shafts. One of the cylinders 114 has a sleeve portion 116 extending through to the outer side of the support 104 and carries a crank 117 by which it may be rotated. The handle 118 of the crank is formed as a bell-crank, one arm of which carries a detent 119 adapted to drop between the teeth of a wheel 120 fixed on the shaft 115. Each series of cylinders 113 and 114 are provided with sprockets 121 and 122 respectively, connected by chains 123. By rotating the crank handle 118 when in the full line position of Fig. 8, all the cylinders of both series will be rotated simultaneously. If, however, the handle is moved into the dotted line position of that figure only the cylinders 114 will be rotated. As these cylinders are rotated cam grooves 124 on their peripheries coact with cam rolls 125 on the bars 111, causing the guides 107 to be moved laterally. The cam rolls are held in proper position on their respective cam cylinders by angles 126 attached to the lower bars 111 and bearing against the sides of the cylinder, as is clearly shown in Fig. 9. Thus the cam cylinders and rolls are always held in proper relationship no matter what the condition of longitudinal adjustment of the feed table. The whole effect of the construction described is to permit the side guides 107 to be moved either together or separately, so that any desired spacing can be obtained and the fabric centered in any desired relationship to the rolls 43, 47. As mentioned above, if the feature of universal adjustability is not desired these cam cylinders and attendant parts may be omitted and fixed side guides substituted.

The bias cut strip of fabric a introduced between the rolls 43 and 47 by the mechanism just described is pressed by the action of these rolls against bead wires *b* which are held in properly spaced position by grooves 127 in the rolls 47 and 52. This condition is indicated in Fig. 12. After the fabric has passed between the rolls it meets a pair of concave rollers 128 held in yokes 129 which slide in members 130 preferably adjustably held in an arm 131. The arm 131 is pivoted in the base 40 on a shaft 132, and is swung by mechanism to be described outwardly away from the rollers to facilitate the removal of a finished band and the placement of fresh bead wires. The stems of yokes 129 are pressed towards the beads by springs 133 which bear against adjustable abutments 134. Rollers 128 bend the edge portion *c* of the fabric partially around the bead wire, as shown in Fig. 20, and this operation is continued as in Fig. 21 by rollers 135 which are set at a greater angle and which are also carried by the arm 131.

The final folding of the edge of the fabric around the bead wire is, in the operation of forming the first two plies, conveniently done by the medium of an air jet. In the preferred form shown in the drawings the air is supplied through pipes 136, which, as is best shown in Figs. 1 and 3, are bent gradually around the bead wires. The surface of the pipes nearest the fabric is provided with a series of small holes 137 (Figs. 22 and 23) so that the outstanding margin of the fabric is blown over gradually and without friction or tendency to wrinkle. When the fabric has been bent over to the condition shown in Fig. 23 it has just about reached the surface of roll 52 and is pinched between that roll and the overlying body of fabric. During its passage around that roll the margin is held tightly pressed against the body of the fabric and is firmly stuck in place. The folding of the fabric is progressive and entirely automatic, requiring no action on the part of the operator besides the placing of the fabric on the feed table. A convenient way of controlling the admission of compressed air into the pipes 136 is illustrated in Figs. 2, 3 and 4. Pipes 136 are connected to a pipe 138 which is joined to the main 139 by a valve 140. This valve has its operating plunger formed as a button 141 with which a rearward extension 142 of the shipper lever 79 contacts when the latter is in position to cause engagement of the clutch. By this means air is admitted to the system only when the clutch treadle 83 is depressed to start the machine in operation.

In order to permit easy access to the rolls 47 and 52 for removing the composite band and for applying fresh bead wires, it is desirable to swing the arm 131 outwardly away from the rolls upon its pivot shaft 132 when the rolls are caused to approach each other by the eccentric mounting described above. One way of accomplishing this automatically is shown in Fig. 27. A link 143 is there shown as pivoted at 144 to the arm and pivoted at 145 to a bar 146 secured to the eccentric 48 of roll 47. The rolls are shown separated in Fig. 27, and the outwardly tilted position of the arm is clearly apparent, as it also is (viewed from the opposite side of the machine) in Fig. 24. When the eccentric is rotated in the direction of the arrow in Fig. 27, the roll 47 will be drawn towards roll 43 and the arm 131 will be swung downwardly so that it lies in the active position of Figs. 1 and 32.

It is generally preferable to lay two plies of fabric on the beads before inverting and proceeding to the second operation. The present machine lends itself readily to this as the first and second plies can be spliced together either before they are placed on the table or directly on the table itself and fed through the rolls and the folding mechanism as a single operation. A convenient way of aligning the two plies on the feed table when the overlap around the beads is to be "stepped off", or greater for one ply than the other (Fig. 14), is to set the side guides 107 at a greater distance apart than the width of either ply and to align the first ply against one guide and the second ply against the other. In this method of securing the desired step-off the greatest overlap will be in the first ply at one side of the tire, and in the second ply on the other side (Fig. 14). The successive steps in reaching this result are shown in Figs. 12 and 13. When the laying of the two plies has been completed the band is removed from the machine, inverted, and placed in the same or a similar machine for the application of additional material.

As stated above, it is preferable to use a separate machine for the application of the third and fourth plies, for the reasons that the folding devices and the contour of the rolls can be exactly suited to the particular shape of the band at two stages, and that the use of two machines renders the operation progressive, facilitating both the work of the operators and the placing of the stock for their use. The machine as adapted for the second operation is similar in principle, having the same feed table and the same arrangement of rolls 43, 47 and 52, differing, however, in the devices shown for folding the edges of the material around the beads and in the addition of mechanism for applying covering rubber such as the side-walls, tread, chafing strip, or other material, to the completely built-up flat carcass.

The edge-folding mechanism (see Fig. 31) adapted for the second two layers is supported in part by arm 131 and in part by a cross-bar 150 attached at one end to the base 40 and at the other to the spacing member 61 which connects the shafts 42 and 49 which support rolls 43 and 47. The arm 131 carries two brackets 151, preferably both mounted for lateral adjustment, and bushed to receive a cross-shaft 152. This shaft carries at one end a sprocket 153 which is connected by a chain 154 with a sprocket 155 (Fig. 33). A gear 156 on the shaft of this sprocket meshes with a similar gear 157 on the shaft of a sprocket 158 which is connected by a chain 159 with a sprocket 160 on a short countershaft 161 (Fig. 31). A chain connection 162 from this countershaft serves to drive a shaft 163 supported in suitable bearings on the cross-bar 150. Gear 157 is driven by a gear 164, upon the shaft of which is a gear 165 deriving its motion through gears 166 from gear 69. The shafts 152 and 163 are thus driven in opposite directions (in order to keep the surfaces of the various rolls moving in the same direction as the fabric) at all times during the rotation of the rolls, without interference with the swinging of arm 131 when the machine is placed in inactive position for removal of the band.

The swinging arm 131 when arranged for the folding of the margins of the third and fourth layers carries the bead aligning rollers 128 in the manner previously described. Instead of the rolls 135 and the air jet, however, the arm 131 is fitted with a pair of preferably rubber-covered rollers 167 and 168 at each side of the band, the rolls being driven through gearing 169 and 170 respectively from the shaft 152. Preferably the ratios of the gearing and the diameter of the rolls are kept such that the surface speed of the rolls will be substantially the same as the speed of the material upon which it acts. Similar sets of rolls 171 and 172 are driven by gearing 173 and 174 from the shaft 163 (Fig. 32). The action of these various rollers is indicated in Figs. 35 to 39, in which it will be seen that the action upon the marginal portions c of the fabric is progressive, positive and smooth.

Preferably the roll 43 is grooved as at 175 for the reception of the bead portions of the inverted band to which the third and fourth plies are applied. If desired, a similar grooving may be employed in the laying of the first two plies. The use of a groove is preferably accompanied by a thickening of the roll at 175' adjacent the groove so that additional pressure is applied to the folded-over fabric to tighten it around the bead. The remainder of the roll surface is shaped so as to give the laminated band a smooth and even pressure sufficient to unite the the layers of uncured rubber with which the plies are covered.

The machine when fitted up for the laying of the third and fourth plies on the inverted partially built carcass is also preferably arranged for applying the side-walls, the chafing strips, and the thread parts, or such a combination of these as may be desired, to the completed carcass. The arrangement is preferably such that the application of the covering material may be carried on as an operation substantially continuous with the application of the last ply of carcass material. The apparatus which is employed for this purpose in the present embodiment of the invention is shown in Figs. 24, 25, 26 and 34. As shown, the apparatus is designed to apply the side-walls and chafing strips only, the tread being left for application at a later time. If desired, however, the apparatus can apply the tread simultaneously with the side-walls by suitably shaping the contour of the device for carrying the tread into contact with the carcass, as in Fig. 40.

The device for applying the covering rubber is simply a long table 176 borne upon anti-friction rolls 177 carried between bars 178 which are supported on suitable pedestals 179. The height of the table is made such that when the covering rubber is laid upon it in flat strip form the strip will be pressed against the underside of that portion of the carcass supported by roll 52 when the table is moved in the direction of the arrow 180 in Fig. 24. The table is conveniently started manually in this motion, the friction between it and the carcass being sufficient to carry the table completely under the roll. A supporting roll 181 serves to bear the strain necessary to force the table toward roll 52, and to prevent buckling of the table under this strain. The top of the table is preferably made with a molded rubber support 182, shaped so that when the strip material d is laid upon it as in Fig. 34 the resulting surface will be of a contour such that the material will be pressed evenly against the carcass. If desired the trackway formed by rolls 177 may be arranged so as to slant upwards to the right as viewed in Fig. 24, thus permitting the return of the table by gravity after the transference of the covering material to the carcass and the removal of the latter from the machine.

The operation of the machine will be clear from what has preceded, but can be briefly summarized as follows. With the rolls 47 and 52 caused to approach each other as shown in Fig. 24, a pair of fabric covered bead wires are placed in the grooves 127 and tightened by separating the rolls to their normal running positions of Figs. 3 and 32. A strip of bias cut fabric having been laid on the feed table the rolls and the feed table are started in operation, and the strip is drawn between rolls 43 and 47, sticking it to the outer covering of the bead wires. As the leading end of the strip reaches the folding devices its marginal portions are folded around and under the beads, this operation being continuous and progressive until the band is formed complete. It may be found that the leading end 183 (Fig. 6) of the bias cut strip forming the initial ply will tend to strike the belt 102 and bend back upon itself, and as a means of preventing this a small pipe 184, connected to a source of compressed air, may be arranged to direct a small jet of air against this part of the fabric, as indicated in Fig. 6. As stated above, the second strip of material is preferably stuck to the initial ply while on the feed table, the two then going through as a single unit. When the travel of the beads has been such that the strip $a$, whether one or two plies in length, has entirely passed the folding devices, the machine is stopped, the rolls 47 and 52 again caused to approach each other, and the partially completed carcass removed. The carcass is now inverted (Fig. 15), the fabric covering of the beads permitting a slight slippage or turning of the carcass plies around the wires, and placed either in the same machine or, preferably, in another machine of generally similar construction but having folding devices designed especially for the folding of the later plies and having the device for applying the covering rubber. When the partially completed carcass has been clamped in place in this second machine by a separation of rolls 47 and 52, the application of the third and fourth plies proceeds exactly as in the case of the first two. During or after the application of the last ply the table carrying the covering rubber is pushed into contact with the carcass, and the assembly of the carcass is completed.

While I have described my invention with some particularity as to detail in order to set forth one preferred embodiment of it, it will be understood that many of these details can be varied widely. The invention is not limited to the construction set forth for the purposes of illustration, and has been defined broadly in the accompanying claims.

Having thus described my invention, I claim:

1. A tire building machine comprising means for tensioning a pair of bead rings into tightly stretched oval form and in spaced relation, means for supplying a strip of tire building material to the outer circumferences of the rings, and means for folding the marginal edges of the material inwardly around the rings.

2. A tire building machine comprising a pair of grooved rolls adapted to hold a pair of bead rings looped around them in spaced relation, means for separating the rolls to tension the bead rings, a third roll for pressing a strip of tire building material against the outer circumferences of the rings, and means for folding the marginal edges of the material inwardly around the rings, the contour of that one of the grooved rolls remote from the third roll being such as to press said turned-over edges firmly against the body of the strip.

3. A tire building machine comprising a pair of spaced rolls adapted to hold tautly a pair of bead rings, a third roll coacting with one of said spaced rolls for pressing a strip of carcass building material against the outer circumferences of the rings, and a flat table adapted to carry covering rubber and mounted to slide tangentially to the other of said spaced rolls and to press the covering rubber against the carcass material.

4. A tire building machine comprising a pair of spaced rolls adapted to hold tautly a pair of bead rings looped around them, means for attaching a strip of tire building material to the outer periphery of the rings, and a series of rolls having their axes at progressively greater inclinations to the surface of the strip to fold the marginal portions of the material inwardly around the rings.

5. A tire building machine comprising a pair of spaced rolls adapted to hold tautly a pair of bead rings looped around them, means for attaching a strip of tire building material to the outer periphery of the rings, means for directing a jet of compressed air against the marginal portions of the band to fold them inwardly partially around the bead rings, and means for completing the folding of the marginal portions.

6. The combination in a tire building machine of means to wind a strip of tire material into band form and hold successive portions of the material tautly in suspended position, and folding devices positioned adjacent the suspended portion of the material and operable to fold the marginal portions of the material to fake beaded edges on the band.

7. The combination in a tire building machine of a pair of pressure rolls and a tension roll arranged to hold a pair of bead rings, a feed table arranged in line with the bight of the pressure rolls, adjustable edge guiding means on the feed table adapted to control the position in which strips of carcass material are fed to the pressure rolls from the feed table, and folding devices to turn the margins of carcass material around the bead rings.

8. The combination in a tire building machine of a pair of pressure rolls and a tension roll adapted to hold a pair of bead rings in spaced position to receive carcass laminations, a feed table on one side of the rolls to direct a strip of carcass material to the bight of the pressure rolls, a folding means on the other side of the rolls operable to fold the margins of the carcass material over the beads as it passes between the rolls, a support for the folding means operable to move it out of position, and a support for the feed table so that it may be moved out of position.

9. The combination in a tire building machine of a pair of pressure rolls, means to feed strips of carcass material and bead members through said rolls in exact predetermined registration, and means beyond and free of both pressure rolls for folding the edges of the material about the beads.

10. A tire building machine comprising a pair of grooved rolls adapted to hold a pair of bead rings looped around them in spaced relation, means for separating the rolls to draw the bead rings tight and into oval form, a third roll for pressing a strip of tire building material against the outer circumferences of the rings, and folding devices for folding the marginal edges of the material inwardly around the rings.

11. A tire building machine comprising means to stretch a pair of spaced endless bead rings into oval form presenting a straight taut suspended portion, means to press a strip of carcass material with overhanging edge portions against the bead rings, and folding devices positioned adjacent the straight suspended portion of the rings for folding the overhanging edge portions of the material around the bead rings.

12. A tire building machine comprising a pair of grooved rolls adapted to hold a pair of bead rings looped around them in spaced relation, means for separating the rolls to draw the bead rings tight and into oval form presenting a straight taut suspended portion, a third roll in pressing relation with one of the grooved rolls, guides for directing a strip of material between the third roll and its coacting grooved roll, and folding devices positioned adjacent the straight suspended portion of the rings and beyond the third roll for folding inwardly around the beads the marginal portions of the strip.

THOMAS MIDGLEY.